United States Patent [19]
Roeschlaub

[11] Patent Number: 5,095,738
[45] Date of Patent: Mar. 17, 1992

[54] INTERNAL COMBUSTION ENGINE HEAD LEAK TESTER

[75] Inventor: Ronald C. Roeschlaub, El Monte, Calif.

[73] Assignee: Irontite Products Co., Inc., El Monte, Calif.

[21] Appl. No.: 659,732

[22] Filed: Feb. 25, 1991

[51] Int. Cl.$^5$ .................. G01M 15/00; G01M 3/02
[52] U.S. Cl. ........................................... 73/49.7
[58] Field of Search ................................. 73/49.7

[56] References Cited

U.S. PATENT DOCUMENTS

| | | | |
|---|---|---|---|
| 3,360,984 | 1/1968 | Salsbury et al. | 73/49.7 |
| 4,594,882 | 6/1986 | Wheeler | 73/49.7 |
| 4,617,824 | 10/1986 | Cybulski et al. | 73/49.7 |
| 4,860,575 | 8/1989 | Robinson | 73/49.7 |

FOREIGN PATENT DOCUMENTS

| | | | |
|---|---|---|---|
| 122551 | 10/1984 | European Pat. Off. | 73/49.7 |
| 88/01733 | 3/1988 | World Int. Prop. O. | 73/49.7 |

*Primary Examiner*—Hezron E. Williams
*Assistant Examiner*—Joseph W. Roskos
*Attorney, Agent, or Firm*—Harris, Kern, Wallen & Tinsley

[57] ABSTRACT

An apparatus for detecting leaks in an internal combustion engine head with head support brackets carried on parallel beams in a support frame, and cam type clamps for clamping an engine head and a head coolant port cover in place on the support frame so that the head can be quickly and easily installed and removed and can be rotated to various orientations while installed during the application of pressure and leak detection.

6 Claims, 3 Drawing Sheets

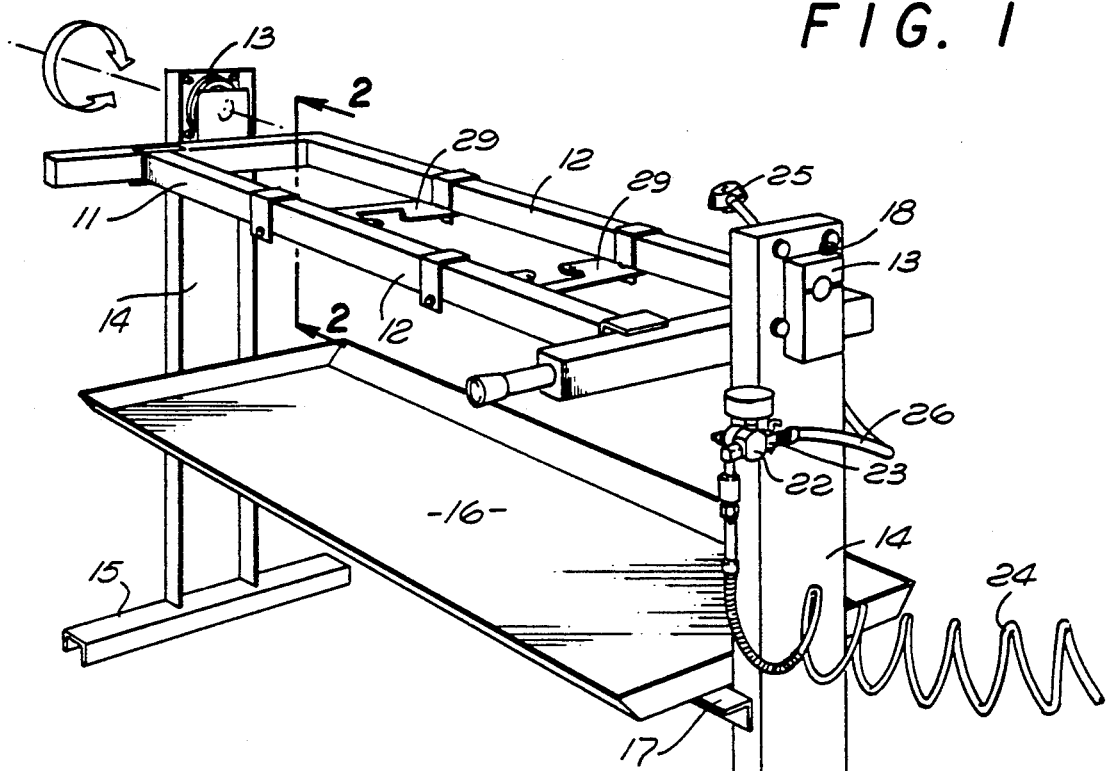
FIG. 1
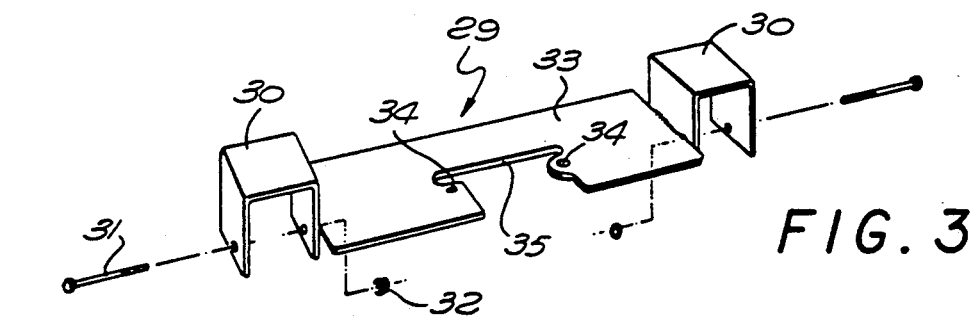
FIG. 2
FIG. 3

INTERNAL COMBUSTION ENGINE HEAD LEAK TESTER

BACKGROUND OF THE INVENTION

This invention relates to crack detection in internal combustion engine heads and in particular, to new and improved apparatus for locating cracks which cause leaks in the coolant passages of the engine head, and for closing off ports on the face of the head when locating the cracks.

In a typical system, the ports of the coolant passages are closed, air under pressure is introduced into the passages, and a leak detector fluid is applied to the head. Bubbles in the fluid indicate leaks and identify crack locations for repair. In such testing, it is desirable to use pressures in the order of 50 psi.

In one prior apparatus the head is mounted in a frame by transverse yokes. The frame is pivotally mounted in spaced uprights which permit the frame and head to be rotated for visual access to all sides of the head. Each coolant port on the face of the head is closed by a separate pad carried on an arm mounted on the frame. With this arrangement, the transverse support yokes and arms and the individual pads must be separately attached and adjusted. This is a time consuming job both in installation and removal. Also, since a large number of individual screws must be tightened, there usually is an additional problem with leakage around one or more ports when operating in the 50 psi range, calling for a first testing for port sealing and a second testing for cracks. In a variation, a face plate bolted onto the head is used in place of the individual pads and clamps for closing the face ports.

The present invention is designed to expedite the mounting of the face plate on the face of the head, and of the head, with the face plate, on the tester with a minimum of time in the plate mounting process.

SUMMARY OF THE INVENTION

It is an object to the present invention to provide a new and improved apparatus for use in detecting leaks and cracks in internal combustion engine heads, which apparatus provides for quick and easy mounting of the head in a support frame and mounting of the plate on the head for sealing and unsealing of the coolant ports of the head. A further object of the invention is to provide such an apparatus which can be used with a variety of heads and which does not require individual adjustment of head mounting devices and port sealing devices.

It is a particular object of the invention to provide such an apparatus including head support brackets which are quickly and easily mounted on the support frame and on which a number of different heads can be mounted merely by resting the head on the brackets. An additional object is to provide a plurality of such clamps which are installed by passing a shaft through the mounting openings in the plate and the head, manually tightening a nut on the shaft finger tight, and then actuating a cam with a single lever motion to produce the clamping pressure at each fastener. With such an arrangement, the individual clamps are suitable for use with any head and do not require any adjustment for spacing or positioning. The operator merely selects a cover plate for the specific head to be tested and attaches it with a plurality of the clamps.

Other objects, advantages, features and results will more fully appear in the course of the following description.

The preferred embodiment of the invention includes first and second head support brackets for mounting on the spaced parallel beams of the frame, preferably by U shaped channels joined by a central support member configured for engaging each end of a head in supporting relation. The apparatus also includes a head cover typically incorporating a gasket and a metal plate, with openings aligned with the mounting openings of the head and with clearance openings providing access to the head for application of detection fluid and visual inspection.

The invention further includes a plurality of clamps for holding the cover to the head, with each clamp having a shaft for passing through aligned cover and head mounting openings and adopted for receiving a threaded nut at one end, with a cam carried at the other end. After the clamps are installed with nuts tightened manually, the cam is rotated to apply a clamping pressure thereby obtaining the desired uniform and high clamping pressure along the entire head.

BRIEF DESCRIPTION OF THE DRAWINGS

FIG. 1 is a perspective view of an apparatus for supporting and testing internal combustion engine heads, and incorporating the presently preferred embodiment of the invention;

FIG. 2 is an enlarged partial sectional view taken along the line 2—2 of FIG. 1;

FIG. 3 is an exploded view showing one of the head support brackets of the apparatus of FIG. 1;

DESCRIPTION OF THE PREFERRED EMBODIMENT

Figure 4:
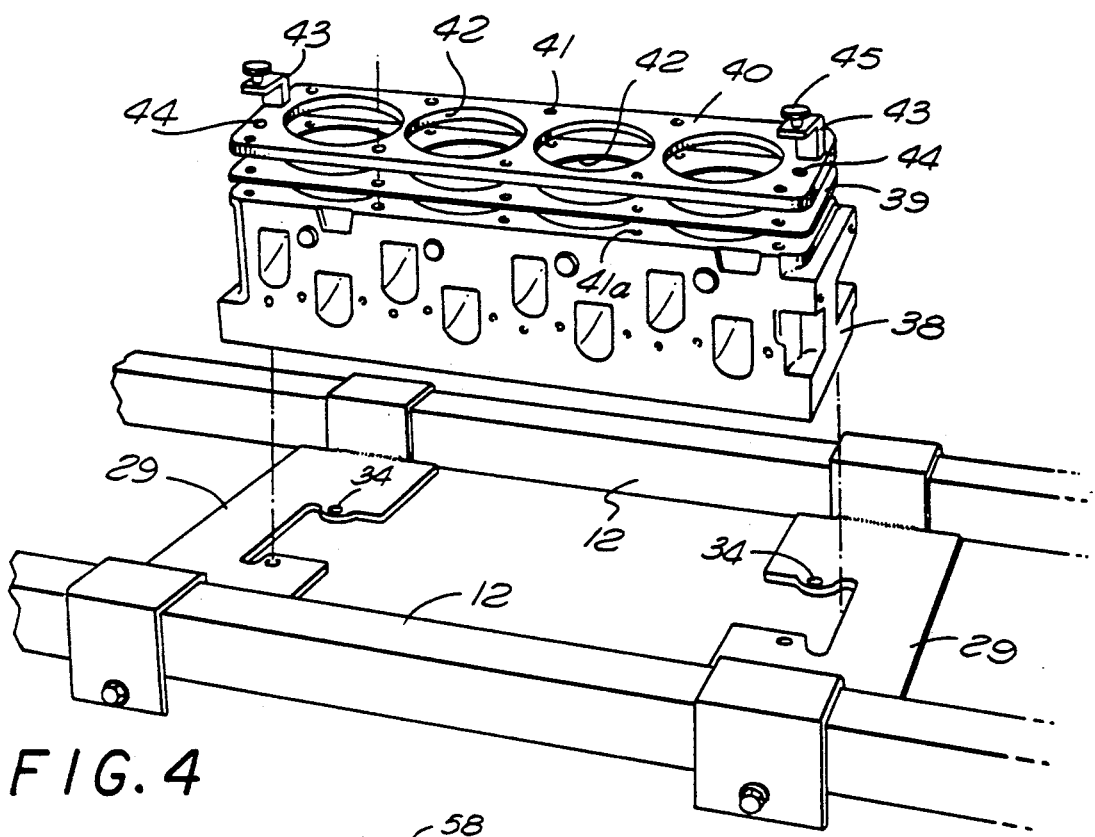
FIG. 4 is an enlarged partial view of the apparatus of FIG. 1 illustrating positioning of an engine head.

The apparatus of FIG. 1 includes a head support frame 11 with spaced parallel beams 12. The frame is mounted in bearings 13 at the upper ends of upright stanchions 14 having bases 15 for resting on a floor or other work surface. A drip pan 16 is carried between the upright stanchions on angle bars 17. The support frame 11 is rotated about the axis of the bearings 13, and may be clamped in any position by a clamp screw 18. An air pressure regulator and gauge 22 with a control valve 23 is mounted on one of the stanchions. A line 24 provides for connection of the regulator to a source of air under pressure. The outlet from the control valve is connected to a nozzle 25 by another line 26.

Two head support brackets 29 are mounted on the spaced parallel beams 12. In the preferred embodiment illustrated in FIGS. 2 and 3, a U shaped channel 30 is provided at each end of the support brackets 29 and dimensioned to fit over the corresponding beam 12, and is clamped in position on the beam by a bolt 31 and nut 32. The channels 30 are joined by a central support member 33 having spaced head mounting openings 34 and a head clearance opening 35.

As shown in FIG. 4, a head 38 of an internal combustion engine is positioned on the brackets 29, with a gasket 39 and a plate 40 on the head. The gasket and plate have mounting openings 41 which are in alignment with correspondings openings 41a in the engine head. Clearance openings 42 in the plate and gasket provide access to the head for leak detection fluid and visual inspection. However the openings are located in the plate and gasket so that the plate and gasket will cover the ports of the coolant passages of the head except for the access openings described below.

Figure 5:
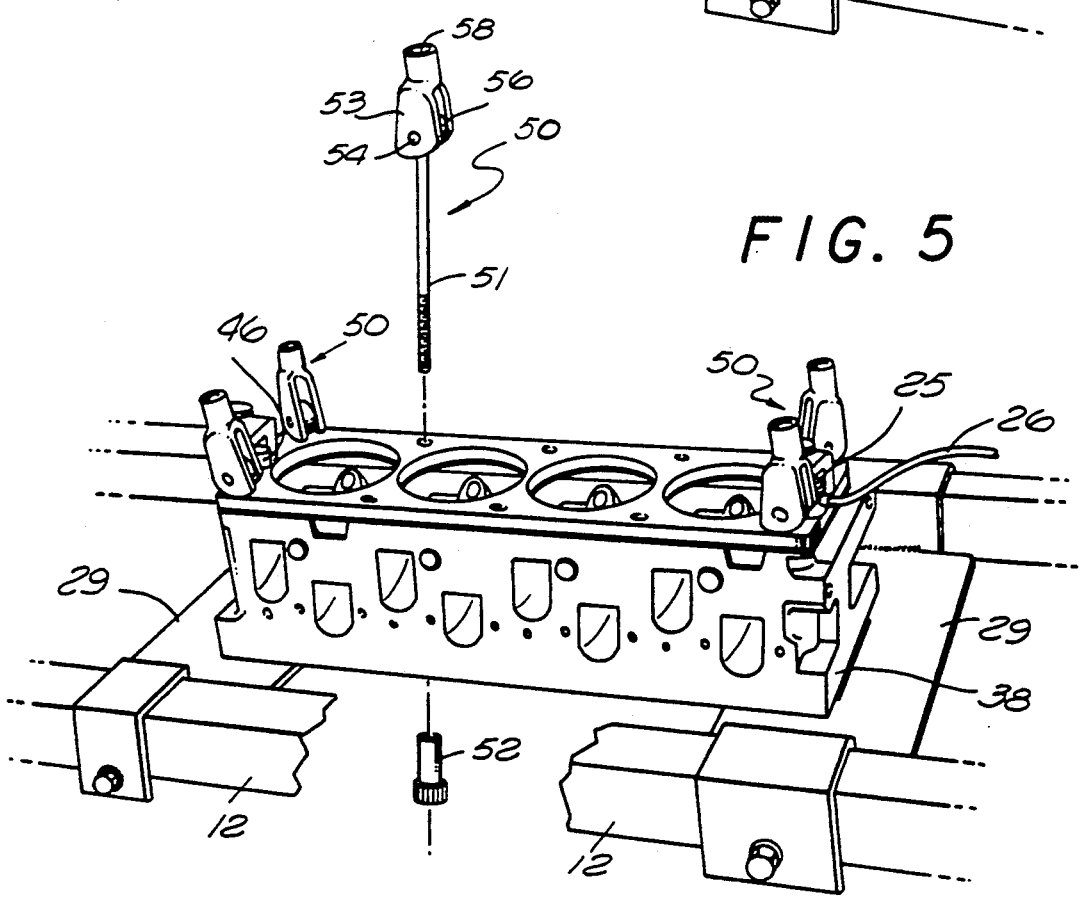
FIG. 5 is a view similar to that of FIG. 4 illustrating positioning of pressure clamps.

One or more pressure nozzle brackets 43 are mounted on the plate 40 adjacent access openings 44 in the plate and cover. These access openings are aligned with ports of the coolant passages to provide an input for air under pressure for the testing operation. When in use, the nozzle 25 is positioned under a bracket over an access opening 44 and held in place by a screw 45, as seen in FIG. 5. When two access openings are provided in the plate and gasket, the other access opening is closed by a pad 46 held in place in the same manner as is the nozzle 25.

The plate and gasket are attached to the head by clamps 50, with each clamp including a shaft 51, a nut 52, a cam 53, and a pin 54. The clamp shaft 51 is positioned in the aligned mounting openings of the plate, gasket and head, with the cam 53 at the upper surface. The nut 52 is threaded onto the lower end of the shaft and manually tightened to a snug fit. Typically, four of the clamps also pass through the openings 34 of the support brackets 29 for clamping the head to the head support frame.

Figure 6:
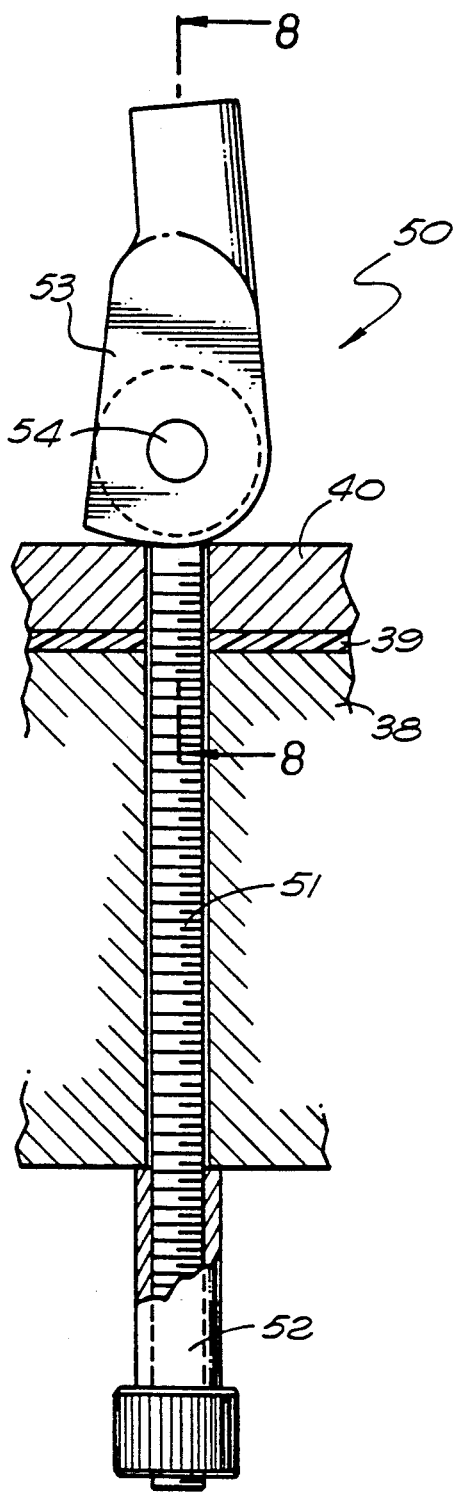
FIG. 6 is an enlarged side view, partly in section, of a pressure clamp installed in the unlocked position.
Figure 7:
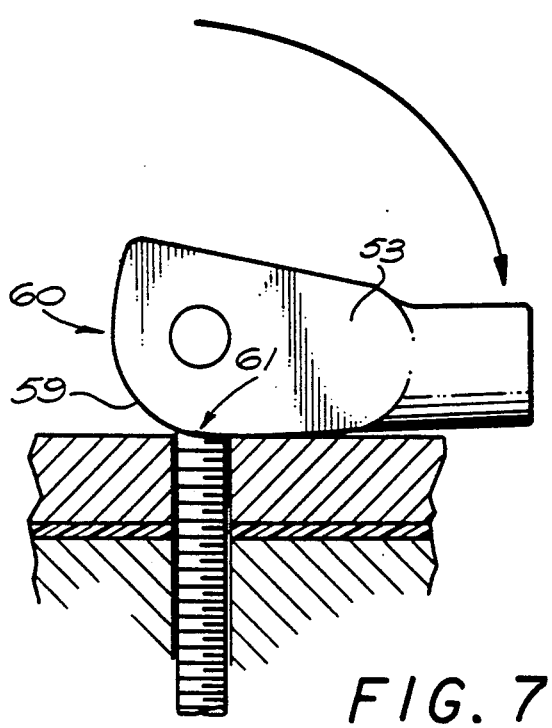
FIG. 7 is a partial view similar to that of FIG. 6 showing the clamp in the locked or pressure position.
Figure 8:
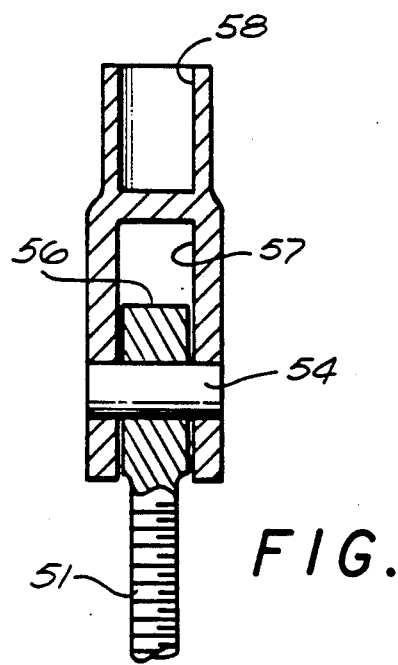
FIG. 8 is a partial sectional view taken along the line 8—8 of FIG. 6.

An eye 56 at the upper end of the shaft is positioned in a slot 57 in the cam and is held in place by the pin 54, so that the cam can rotate between an unlocked position shown in FIG. 6 and a locked position shown in FIG. 7. Preferably, a socket 58 is provided in the free end of the cam for insertion of a rod for manually rotating the cam between the unlocked and locked positions. The cam has an arcuate cam surface 59 with the distance between the axis of rotation of the cam and the cam surface at the zone 60 where the cam engages the plate 40 in the unlocked position as shown in FIG. 6, less than the distance between the axis of rotation and the cam surface at the zone 61 where the cam engages the plate in the locked position as shown in FIG. 7. With this configuration, the desired clamping pressure on the plate is easily acheived by merely rotating each cam from the unlocked position to the locked position. Sealing of the coolant passage ports at pressures in excess of the 50 psi is readily achieved with this arrangement.

In use, two head support brackets 29 having the head mounting openings 34 and head clearance opening 35 suitable for the head to be tested are selected. The selected brackets are placed on the parallel beams and fastened in place with the bolts 31 and nuts 32, with the desired spacing between the two support brackets. A number of different engine heads can be accomodated with a single pair of support brackets, and only a few sets of support brackets are required for handling most existing engine heads. The head is then placed on the support brackets with the plate and gasket on the head.

The clamp shafts are inserted through the aligned openings and the nuts applied to hand tight condition. Then the cams are rotated from the unlocked position to the locked position. Finally, an air line nozzle is clamped in place at one of the nozzle brackets 43 and a port closing pad 46 is clamped in place at the other. The apparatus is connected to the air supply line and the pressure regulator is adjusted to the desired condition. Then the valve 23 is opened and the leak detection fluid is applied over the entire head, typically by spraying. The head is visually inspected for leaks and the location of cracks is marked. Rotation of the support frame 11 permits inspection of all surfaces of the head. Finally, the valve 23 is closed, the clamps are released by rotation to the unlocked position, the plate and gasket are removed and the head is lifted from the support brackets.

I claim:

1. In an apparatus for detecting leaks in an internal combustion engine head, said apparatus having a support frame with spaced parallel beams, the improvement comprising in combination:
   first and second head support brackets, each of said brackets having beam mounting means at each end thereof joined by a central head support member;
   head cover means for positioning on an engine head for covering the coolant passage ports of said head, with said head cover means having mounting openings aligned with mounting openings in said head;
   clamp means for clamping said head cover means on said head, said clamp means including a shaft for positioning in said aligned head and head cover means openings, with one end threaded for interengagement with a threaded nut and with a cam mounted on the other end for pivoting between an unlocked position with said shaft not stressed and a locked position with said shaft stressed to apply pressure to said head cover means and head; and
   pressure means for mounting on said head cover means at one of said coolant passage ports for applying fluid under pressure to said coolant passage of said head.

2. An apparatus as defined in claim 1, wherein said cam includes means defining a slot, and said shaft other end includes an eye positioned in said slot, with a pivot pin carried in said slot and passing through said eye,
   with said cam having an arcurate cam surface of varying radius about said pin and eye, and having means defining a socket spaced from said slot and pin for receiving a cam rotation bar.

3. An apparatus as defined in claim 2 wherein said head cover means includes a gasket for mounting on said head and a plate for mounting on said gasket and in engagement by said cams, with said gasket and plate having openings for access to said head for application for leak detection fluid and visual inspection.

4. An apparatus as defined in claim 3 including a pressure nozzle bracket carried on said plate and spaced above one of said mounting openings, and means for applying a clamping pressure to a pressure nozzle positioned between said pressure nozzle bracket and said plate.

5. An apparatus as defined in claim 1 wherein said head support bracket beam mounting means including a U shaped channel for resting on said beam, and bolting means for retaining said channel on said beam, and
   said head support member has means defining a relatively large head receiving opening between spaced mounting openings in said head support member aligned with said head cover means mounting openings.

6. In an apparatus for detecting leaks in an internal combustion engine head, said apparatus having a support frame with spaced parallel beams, the improvement comprising in combination:

head cover means for positioning on an engine head for covering the coolant passage ports of said head, with said head cover means having mounting openings aligned with mounting openings in said head;

first and second head support brackets, each of said brackets having beam mounting means at each end thereof joined by a central head support member, with said head support bracket beam mounting means including a U shaped channel for resting on said beam, and bolting means for retaining said channel on said beam, and with said central head support member having means defining a relatively large head receiving opening between spaced mounting openings in said central head support member aligned with said head cover means mounting openings;

clamp means for clamping said head cover means on said head; and pressure means for mounting on said head cover means at one of said coolant passage ports for applying fluid under pressure to said coolant passage of said head.

* * * * *